United States Patent
Park et al.

(10) Patent No.: US 12,548,525 B2
(45) Date of Patent: Feb. 10, 2026

(54) SCAN DRIVER AND DISPLAY DEVICE INCLUDING THE SAME

(71) Applicant: Samsung Display Co., Ltd., Yongin-si (KR)

(72) Inventors: Jun Hyun Park, Yongin-si (KR); Bon Yong Koo, Yongin-si (KR); Hyun Joon Kim, Yongin-si (KR); Young Wan Seo, Yongin-si (KR); Ji Hoon Yang, Yongin-si (KR); Min Jae Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/052,301

(22) Filed: Feb. 13, 2025

(65) Prior Publication Data

US 2025/0391374 A1    Dec. 25, 2025

(30) Foreign Application Priority Data

Jun. 20, 2024    (KR) .................. 10-2024-0080242

(51) Int. Cl.
*G09G 3/3266*   (2016.01)
*G06F 3/041*    (2006.01)
*G09G 3/32*     (2016.01)

(52) U.S. Cl.
CPC ......... *G09G 3/3266* (2013.01); *G06F 3/0416* (2013.01); *G09G 3/32* (2013.01); *G06F 2203/04106* (2013.01); *G09G 2310/0267* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 11,741,903 B2 | 8/2023 | In | |
| 11,804,171 B2 | 10/2023 | Park et al. | |
| 2024/0112632 A1* | 4/2024 | Song | G06F 3/0446 |
| 2025/0209988 A1* | 6/2025 | Seo | G09G 3/3677 |

FOREIGN PATENT DOCUMENTS

| | | |
|---|---|---|
| CN | 115909935 A | 4/2023 |
| KR | 10-2023-0044091 A | 4/2023 |
| KR | 10-2023-0044910 A | 4/2023 |
| KR | 10-2023-0083393 A | 6/2023 |

* cited by examiner

*Primary Examiner* — Stephen T. Reed
(74) *Attorney, Agent, or Firm* — Innovation Counsel LLP

(57) ABSTRACT

The present disclosure relates to a scan driver and a display device including the same. According to an embodiment of the disclosure, a scan driver comprising stages configured to sequentially output scan signals to scan signal lines, wherein at least one stage comprises an output node controller configured to apply a gate-on voltage to a pull-up node in response to a gate control signal, and an output controller configured to output a scan signal to each of the scan signal lines, wherein the output node controller comprises a first transistor that enables the pull-up node in response to a scan clock signal, and wherein the first transistor comprises a gate electrode connected to a scan clock terminal, a first electrode connected to a previous-stage carry terminal, and a second electrode connected to the pull-up node.

20 Claims, 9 Drawing Sheets

SCAN DRIVER AND DISPLAY DEVICE INCLUDING THE SAME

This application claims priority to Korean Patent Application No. 10-2024-0080242 filed on Jun. 20, 2024, in the Korean Intellectual Property Office, and all the benefits accruing therefrom under 35 U.S.C. 119, the contents of which in its entirety are herein incorporated by reference.

BACKGROUND

1. Field of the Disclosure

The present disclosure relates to a scan driver and a display device including the same.

2. Description of the Related Art

As the information-oriented society evolves, various demands for display devices are ever increasing. For example, display devices are being employed by a variety of electronic devices such as smart phones, digital cameras, laptop computers, navigation devices, and smart televisions.

Display devices may be flat-panel display devices such as a liquid-crystal display device, a quantum-dot display device, and an organic light-emitting display device.

A display device includes a display panel including data lines, scan signal lines, a plurality of pixels connected to the data lines and the scan signal lines, a scan driver for supplying scan signals to the scan signal lines, and a data driver for supplying data voltages to the data lines.

The scan driver may be formed in the non-display area of the display panel. The scan driver formed in the display panel includes a plurality of thin-film transistors that are turned on and off in response to gate control signals. Since the thin-film transistors of the scan driver are required to remain turned on or turned off for a certain period of time, the level of the driving voltage of the thin-film transistors should be constant.

SUMMARY

Aspects of the present disclosure provide a scan driver with altered design structure to reduce the level of the driving voltage of thin-film transistors, and a display device including the same.

Aspects of the present disclosure also provide a scan driver in which a composition material for a semiconductor layer of at least one thin-film transistor directly connected to a pull-up node of scan signal output stages is improved, and a display device including the same.

It should be noted that objects of the present disclosure are not limited to the above-mentioned object; and other objects of the present disclosure will be apparent to those skilled in the art from the following descriptions.

According to an embodiment of the disclosure, a scan driver comprising stages configured to sequentially output scan signals to scan signal lines during an active period of an $n^{th}$ frame, respectively, where n is a positive integer, wherein at least one stage among the stages comprises an output node controller configured to apply a gate-on voltage to a pull-up node in response to a gate control signal from a display driver, and an output controller configured to output a scan clock signal input from a scan clock terminal as a scan signal to each of the scan signal lines connected thereto when the gate-on voltage is applied to the pull-up node, wherein the output node controller comprises a first transistor that enables the pull-up node with a start signal or a previous-stage scan signal input having a gate-on voltage level in response to a first or second scan clock signal, and wherein the first transistor comprises a gate electrode connected to a first or second scan clock terminal, a first electrode connected to a previous-stage carry terminal, and a second electrode connected to the pull-up node.

According to an embodiment of the disclosure, a display device comprising a plurality of pixels arranged in a display area of a display panel, a touch sensing unit disposed on a front side of the display panel, a touch driver configured to detect a touch of a human body or a touch pen using a plurality of touch electrodes arranged in the touch sensing unit, a display driver configured to control data voltages provided to the plurality of pixels and image display timing of the pixels, and a scan driver configured to sequentially drive scan signal lines connected to the pixels in response to a gate control signal from the display driver, wherein the scan driver comprises stages configured to sequentially output scan signals to scan signal lines during an active period of an $n^{th}$ frame, respectively, where n is a positive integer, wherein at least one stage among the stages comprises an output node controller configured to apply a gate-on voltage to a pull-up node in response to a gate control signal from the display driver, and an output controller configured to output a scan clock signal input from a scan clock terminal as a scan signal to each of the scan signal lines connected thereto when the gate-on voltage is applied to the pull-up node, and wherein the output node controller comprises a first transistor that enables the pull-up node with a start signal or a previous-stage scan signal input having a gate-on voltage level in response to a first or second scan clock signal.

According to embodiments of the present disclosure, it is possible to reduce power consumption of a display device by altering the design structure of a scan driver in order to lower the level of the driving voltage of thin-film transistors formed in scan signal output stages.

In addition, by improving a composition material for a semiconductor layer of at least one thin-film transistor directly connected to a pull-up node of the scan signal output stages, it is possible to improve electrical characteristics such as high-speed operation or to stabilize operation range variations, threshold voltage variations, etc.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present disclosure will now be described more fully hereinafter with reference to the accompanying drawings, in which preferred embodiments of the disclosure are shown. This disclosure may, however, be embodied in different forms and should not be construed as limited to the embodiments set forth herein. Rather, these embodiments are provided so that this disclosure will be thorough and complete, and will filly convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
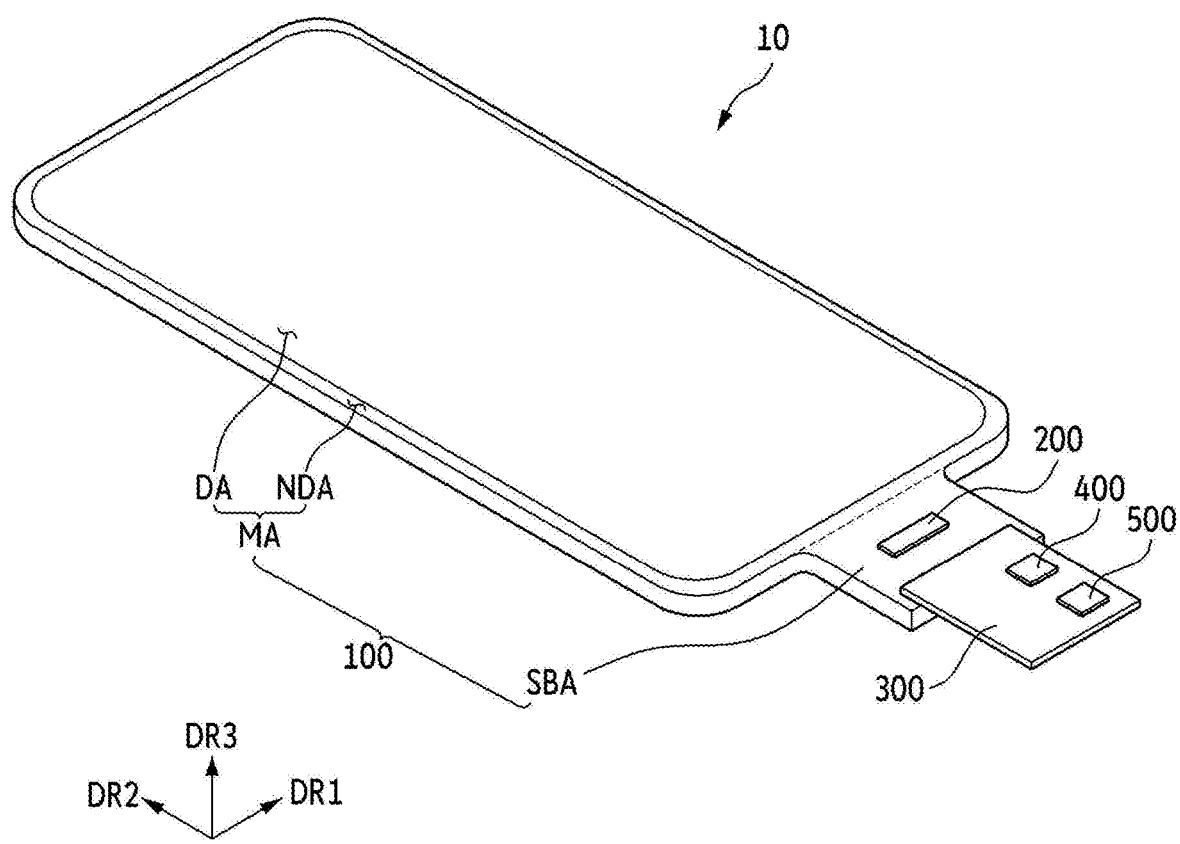
FIG. 1 is a perspective view showing a display device according to an embodiment of the present disclosure.

FIG. 1 is a perspective view showing a display device according to an embodiment of the present disclosure.

Referring to FIG. 1, a display device 10 may be employed by portable electronic devices such as a mobile phone, a smart phone, a tablet PC, a mobile communications terminal, an electronic notebook, an electronic book, a portable multimedia player (PMP), a navigation device and an ultra-mobile PC (UMPC). For example, the display device 10 may be used as a display unit of a television, a laptop computer, a monitor, an electronic billboard, or the Internet of Things (IOT). For another example, the display device 10 may be applied to wearable devices such as a smart watch, a watch phone, a glasses-type display, and a head-mounted display (HMD) device.

The display device 10 may have a shape similar to a quadrangular shape when viewed from the top. For example, the display device 10 may have a shape similar to a rectangle having shorter sides in a first direction DR1 and longer sides in a second direction DR2. The corners where the shorter sides in the first direction DR1 meet the longer sides in the second direction DR2 may be rounded with a predetermined curvature or may be a right angle. The shape of the display device 10 when viewed from the top is not limited to a quadrangular shape, but may be formed in a shape similar to other polygonal shapes, a circular shape, or an elliptical shape.

The display device 10 may include a display panel 100, a display driver 200, a circuit board 300, a touch driver 400, and a power supply unit 500.

The display panel 100 may include a main area MA and a subsidiary area SBA.

The main area MA may include a display area DA having pixels for displaying images and a non-display area NDA located around the display area DA. The display area DA may output light from a plurality of emission areas or a plurality of open areas. For example, the display panel 100 may include a pixel circuit including switching elements, a pixel-defining layer that defines the emission areas or the open areas, and self-light-emitting elements.

For example, the self-light-emitting element may include, but is not limited to, at least one of an organic light-emitting diode including an organic emissive layer, a quantum-dot light-emitting diode (quantum LED) including a quantum-dot emissive layer, an inorganic light-emitting diode (inorganic LED) including an inorganic semiconductor, and a micro light-emitting diode (micro LED).

The non-display area NDA may be located on the outer side of the display area DA. The non-display area NDA may be the edge of the main area MA of the display panel 100. The non-display area NDA may include a gate driver (not shown) that applies gate signals to gate lines and fan-out lines (not shown) that connect the display driver 200 with the display area DA.

The subsidiary area SBA may extend from one side of the main area MA. The subsidiary area SUB may include a flexible material that can be bent, folded, or rolled. For example, when the subsidiary area SBA is bent, the subsidiary area SBA may overlap with the main area MA in the thickness direction (e.g., third direction DR3). The subsidiary area SBA may include pads connected to the display driver 200 and the circuit board 300. Optionally, the subsidiary area SBA may be eliminated, and the display driver 200 and the pads may be disposed in the non-display area NDA.

The display driver 200 may output signals and voltages for driving the display panel 100. The display driver 200 may supply data voltages to data lines DL. The display driver 200 may provide a supply voltage to a voltage line and may provide a gate control signal to the scan driver (or gate driver). The display driver 200 may be implemented as an integrated circuit (IC) and may be attached on the display panel 100 by a chip-on-glass (COG) technique, a chip-on-plastic (COP) technique, or ultrasonic bonding. For example, the display driver 200 may be disposed in the subsidiary area SBA and may overlap with the main area MA in the thickness direction (third direction DR3) when the subsidiary area SBA is bent. For another example, the display driver 200 may be mounted on the circuit board 300.

The circuit board 300 may be attached on the pad area of the display panel 100 using an anisotropic conductive film (ACF). Lead lines of the circuit board 300 may be electrically connected to the pads of the display panel 100. The circuit board 300 may be a flexible printed circuit board (FPCB), a printed circuit board (PCB), or a flexible film such as a chip-on-film (COF).

The touch driver 400 may be mounted on the circuit board 300. The touch driver 400 may be electrically connected to a touch sensing unit of the display panel 100. The touch driver 400 may supply a touch driving signal to a plurality of touch electrodes of the touch sensing unit and may sense a change in the capacitance between the plurality of touch electrodes. For example, the touch driving signals may be pulse signals having a predetermined frequency. The touch driver 400 may determine whether there is an input and may find the coordinates of the input based on the amount of the change in the capacitance between the touch electrodes. The touch driver 400 may be implemented as an integrated circuit (IC).

The power supply unit 500 may be disposed on the circuit board 300 to supply a supply voltage to the display drivers 200 and the display panel 100. The power supply unit 500 may generate a first driving voltage to supply it to a first driving voltage line VDL, may generate an initialization voltage to supply it to an initialization voltage line VIL, and may generate a common voltage to supply it to a common electrode shared by the light-emitting elements of a plurality of pixels For example, the first driving voltage may be a high-level voltage for driving the light-emitting elements, and the common voltage and a second driving voltage may be low-level voltages for driving the light-emitting elements.

Figure 2:
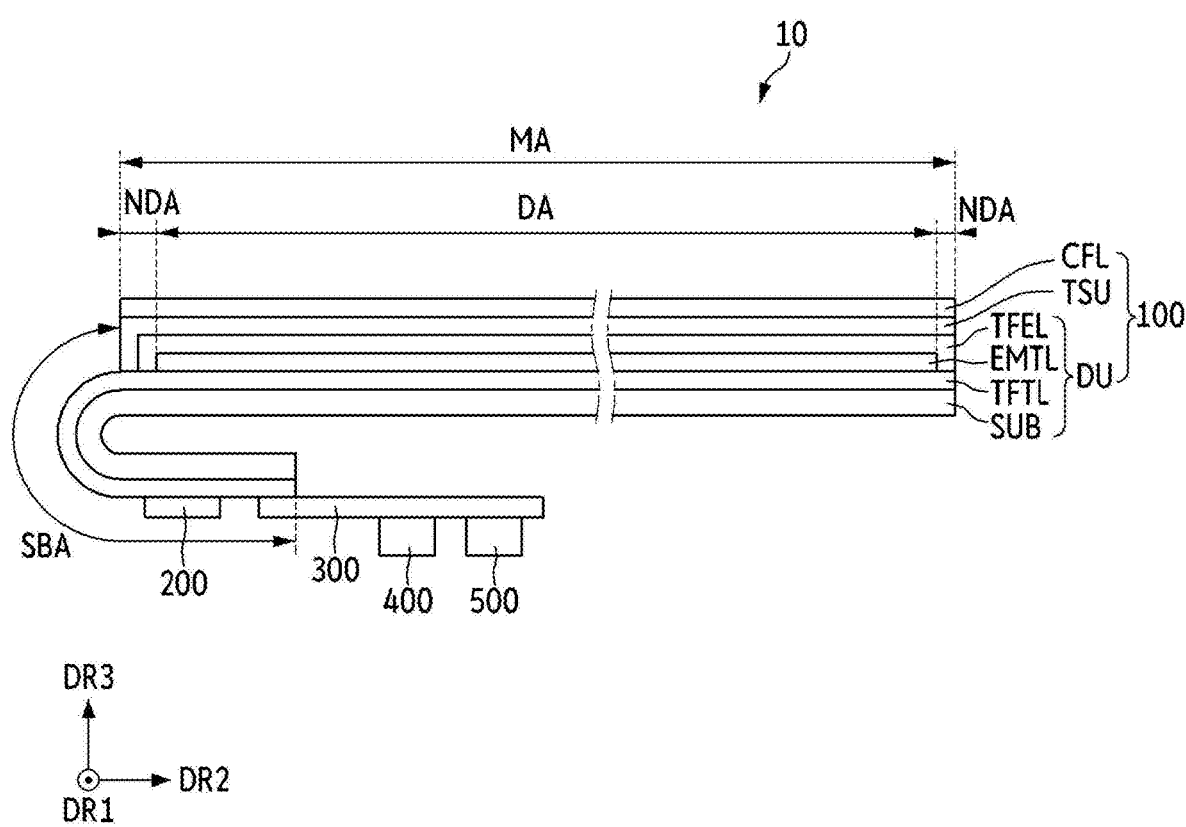
FIG. 2 is a cross-sectional view showing a display device according to an embodiment of the present disclosure.

FIG. 2 is a cross-sectional view showing a display device according to an embodiment of the present disclosure.

Referring to FIG. 2, the display panel 100 may include a display unit DU, a touch sensing unit TSU, and a color filter layer CFL. The display unit DU may include a substrate SUB, a thin-film transistor layer TFTL, an emission material layer EMTL and an encapsulation layer TFEL.

The substrate SUB may be a base substrate or a base member. The substrate SUB may be a flexible substrate that can be bent, folded, or rolled. For example, the substrate SUB may include, but is not limited to, a polymer resin such as polyimide PI. For another example, the substrate SUB may include a glass material or a metal material.

The thin-film transistor layer TFTL may be disposed on the substrate SUB. The thin-film transistor layer TFTL may include a plurality of thin-film transistors forming pixel circuits of pixels. The thin-film transistor layer TFTL may include gate lines, data lines DL, voltage lines, gate control lines, fan-out lines for connecting the display driver 200 with the data lines DL, and lead lines for connecting the display driver 200 with the pads. Each of the thin-film transistors may include a semiconductor region, a source electrode, a drain electrode, and a gate electrode. For example, when the scan driver (e.g., the gate driver) is formed on one side of the non-display area NDA of the display panel 100, the scan driver may include thin-film transistors.

The thin-film transistor layer TFTL may be disposed in the display area DA, the non-display area NDA and the subsidiary area SBA. The thin-film transistors in each of the pixels, the gate lines, the data lines DL, and the voltage lines in the thin-film transistor layer TFTL may be disposed in the display area DA. The gate control lines and the fan-out lines in the thin-film transistor layer TFTL may be disposed in the non-display area NDA. The lead lines of the thin-film transistor layer TFTL may be disposed in the subsidiary area SBA.

The emission material layer EMTL may be disposed on the thin-film transistor layer TFTL. The emission material layer EMTL may include a plurality of light-emitting elements in each of which a pixel electrode, an emissive layer and a common electrode are sequentially stacked to emit light, and a pixel-defining layer for defining emission areas in the pixels. The plurality of light-emitting elements in the emission material layer EMTL may be disposed in the display area DA.

The emissive layer may be an organic emissive layer containing an organic material. The emissive layer may include a hole transporting layer, an organic light-emitting layer and an electron transporting layer. When the pixel electrode receives a data voltage and the common electrode receives a cathode voltage through the thin-film transistors in the thin-film transistor layer TFTL, the holes and electrons may move to the organic light-emitting layer through the hole transporting layer and the electron transporting layer, respectively, such that they combine in the organic light-emitting layer to emit light. For example, the pixel electrode may be an anode electrode while the common electrode may be a cathode electrode. However, the present disclosure is not limited thereto.

As another example, the light-emitting elements may include quantum-dot light-emitting diodes each including a quantum-dot emissive layer, inorganic light-emitting diodes each including an inorganic semiconductor, or micro light-emitting diodes.

The encapsulation layer TFEL may cover the upper and side surfaces of the emission material layer EMTL, and can protect the emission material layer EMTL. The encapsulation layer TFEL may include at least one inorganic layer and at least one organic layer for encapsulating the emission material layer EMTL.

The touch sensing unit TSU may be disposed on the encapsulation layer TFEL. The touch sensing unit TSU may include a plurality of touch electrodes for sensing a user's touch by capacitive sensing, and touch lines connecting the plurality of touch electrodes with the touch driver 400. For example, the touch sensing unit TSU may sense a user's touch by mutual capacitance sensing or self-capacitance sensing.

For another example, the touch sensing unit TSU may be disposed on a separate substrate and the separate substrate including the touch sensing unit TSU may be disposed on the display unit DU. In such case, the substrate supporting the touch sensing unit TSU may be a base member encapsulating the display unit DU.

The plurality of touch electrodes of the touch sensing unit TSU may be disposed in a touch sensor area overlapping the display area DA. The touch lines of the touch sensing unit TSU may be disposed in a touch peripheral area overlapping the non-display area NDA.

The color filter layer CFL may be disposed on the touch sensing unit TSU. The color filter layer CFL may include a plurality of color filters disposed in area corresponding to the plurality of emission areas, respectively. Each of the color filters may selectively transmit light of a particular wavelength and block or absorb lights of other wavelengths. The color filter layer CFL may absorb some of lights introduced from the outside of the display device 10 to reduce the reflection of external light. Accordingly, the color filter layer CFL can prevent distortion of colors due to the reflection of external light.

Since the color filter layer CFL is disposed directly on the touch sensing unit TSU, the display device 10 may require no separate substrate for the color filter layer CFL. Therefore, the thickness of the display device 10 can be relatively reduced.

The subsidiary area SBA of the display panel 100 may extend from one side of the main area MA. The subsidiary area SUB may include a flexible material that can be bent, folded, or rolled. For example, when the subsidiary area SBA is bent, the subsidiary area SBA may overlap with the main area MA in the thickness direction (third direction DR3). The subsidiary area SBA may include pads electrically connected to the display driver 200 and the circuit board 300.

Figure 3:
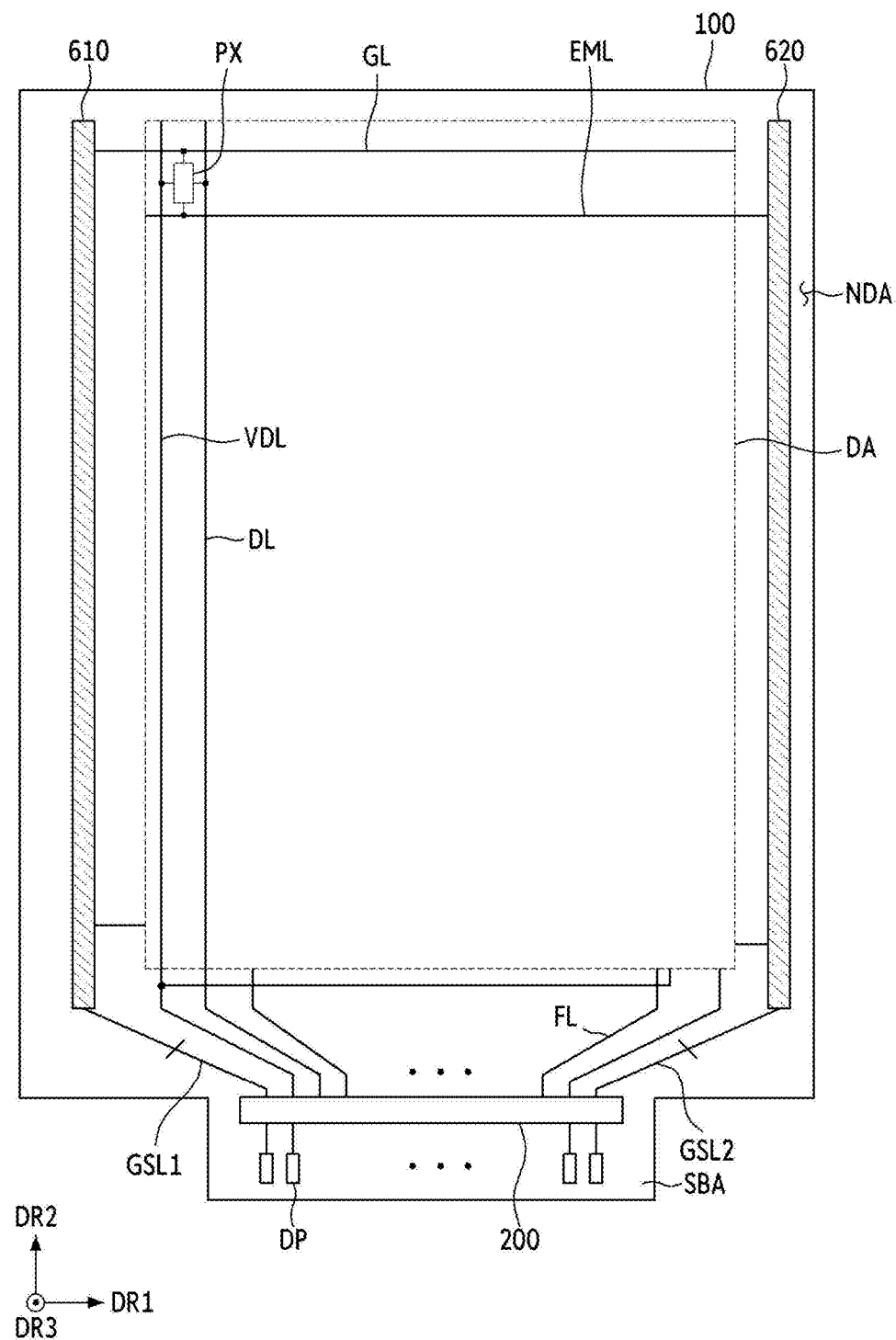
FIG. 3 is a plan view showing a display unit of a display device according to an embodiment of the present disclosure.
Figure 4:
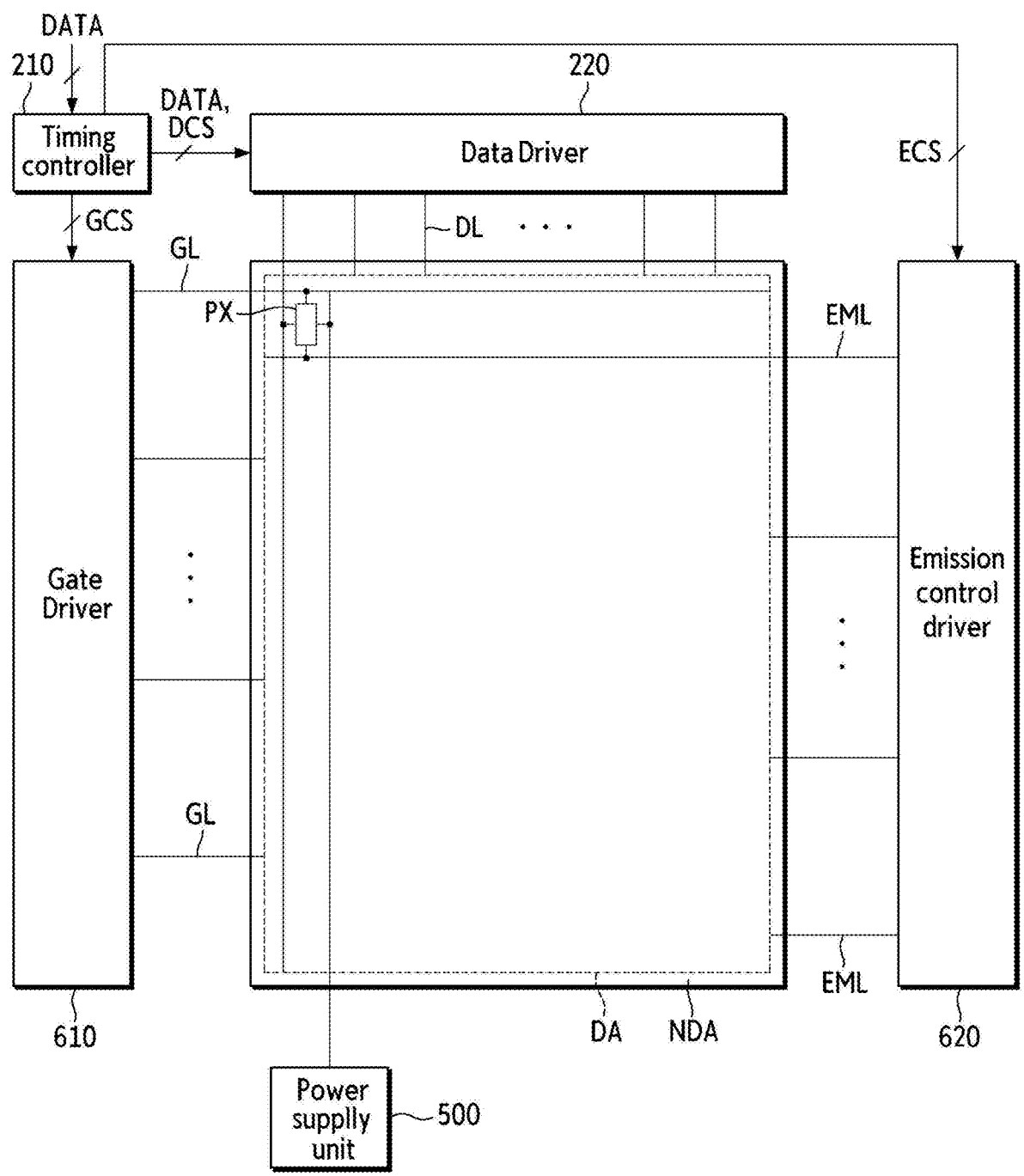
FIG. 4 is a block diagram illustrating the display panel and the display driver according to the embodiment.

FIG. 3 is a plan view showing a display unit of a display device according to an embodiment of the present disclosure. FIG. 4 is a block diagram illustrating the display panel and the display driver according to the embodiment.

Referring to FIGS. 3 and 4, the display panel 100 may include the display area DA and the non-display area NDA.

The display area DA may include a plurality of pixels PX, a plurality of first driving voltage lines VDL connected to the plurality of pixels PX, a plurality of gate lines GL of a plurality of second driving voltage lines VSL, a plurality of emission control lines EML, and a plurality of data lines DL.

Each of the plurality of pixels PX may be connected to a gate line GL, a data line DL, an emission control line EML, a first driving voltage line VDL, and a second driving voltage line. Each of the plurality of pixels PX may include at least one transistor, a light-emitting element, and a capacitor.

The gate lines GL may extend in the first direction DR1 and may be spaced apart from one another in the second direction DR2 intersecting the first direction DR1. The gate lines GL may be arranged in the second direction DR2. The gate lines GL may sequentially supply gate signals to the plurality of pixels PX.

The emission control lines EML may extend in the first direction DR1 and may be spaced apart from one another in the second direction DR2. The emission control lines EML may be arranged along the second direction DR2. The emission control lines EML may sequentially supply an emission control signal to the pixels PX.

The data lines DL may extend in the second direction DR2 and may be spaced apart from one another in the first direction DR1. The data lines DL may be arranged along the first direction DR1. The data lines DL may supply data voltages to the pixels PX. The data voltage may determine the luminance of each of the plurality of pixels PX.

The first driving voltage lines VDL may extend in the second direction DR2 and may be spaced apart from one another in the first direction DR1. The first driving voltage lines VDL may be arranged along the first direction DR1. The first driving voltage lines VDL may supply the first driving voltage to the pixels PX. The first driving voltage may be a high-level voltage for driving light-emitting elements of the pixels PX.

The non-display area NDA may surround the display area DA. A scan driver 610, an emission control driver 620, fan-out lines FL, a first gate control line GSL1 and a second gate control line GSL2 may be disposed in the non-display area NDA.

The fan-out lines FL may extend from the display driver 200 to the display area DA. The fan-out lines FL may supply the data voltage received from the display driver 200 to the plurality of data lines DL.

The first gate control line GSL1 may extend from the display driver 200 to the scan driver 610. The first gate control line GSL1 may provide a gate control signal GCS received from the display driver 200 to the scan driver 610.

The second gate control line GSL2 may extend from the display driver 200 to the emission control driver 620. The second gate control line GSL2 may provide an emission control signal ECS received from the display driver 200 to the emission control driver 620.

The subsidiary area SBA may extend from one side of the non-display area NDA. The display driver 200 and pads DP may be disposed in the subsidiary area SBA. The pads DP may be disposed closer to one edge of the subsidiary area SBA than the display driver 200. The pads DP may be electrically connected to the circuit board 300 through an anisotropic conductive film ACF.

The display driver 200 may include a timing controller 210 and a data driver 220.

The timing controller 210 may receive digital video data DATA and timing signals from the circuit board 300. The timing controller 210 may generate a data control signal DCS to control the operation timing of the data driver 220, may generate a gate control signal GCS to control the operation timing of the scan driver 610, and may generate an emission control signal ECS to control the operation timing of the emission control driver 620 based on the timing signals. The timing controller 210 may provide the gate control signal GCS to the scan driver 610 through the first gate control line GSL1. The timing controller 210 may provide the emission control signal ECS to the emission control driver 620 through the second gate control line GSL2. The timing controller 210 may supply the digital video data DATA and the data control signal DCS to the data driver 220.

The data driver 220 may convert the digital video data DATA into analog data voltages and may supply them to the data lines DL through the fan-out lines FL. The gate signals from the scan driver 610 may be used to select pixels PX to which a data voltage is applied, and the selected pixels PX may receive the data voltage through the data lines DL.

The power supply unit 500 may be disposed on the circuit board 300 to supply driving voltages to the display drivers 200 and the display panel 100. The power supply unit 500 may generate a first driving voltage to supply it to a first driving voltage line VDL, may generate an initialization voltage to supply it to an initialization voltage line VIL, and may generate a common voltage to supply it to a common electrode shared by the light-emitting elements of a plurality of pixels PX.

The scan driver 610 may be disposed on one outer side of the display area DA or on one outer side of the non-display area NDA, and the emission control driver 620 may be disposed on the opposite outer side of the display area DA or on the opposite outer side of the non-display area NDA. It should be understood, however, that the present disclosure is not limited thereto. For another example, the scan driver 610 and the emission control driver 620 may be disposed on one side or the opposite side of the non-display area NDA.

The scan driver 610 may include a plurality of thin-film transistors (hereinafter referred to as transistors) for generating gate signals based on the gate control signal GCS. The emission control driver 620 may include a plurality of transistors for generating emission control signals based on the emission control signal ECS.

The transistors of the scan driver 610 and the transistors of the emission control driver 620 may be formed in the thin-film transistor layer TFTL like the transistors included in the pixels PX. The scan driver 610 may provide gate signals to the gate lines GL, and the emission control driver 620 may provide emission control signals to the emission control lines EML.

Figure 5:
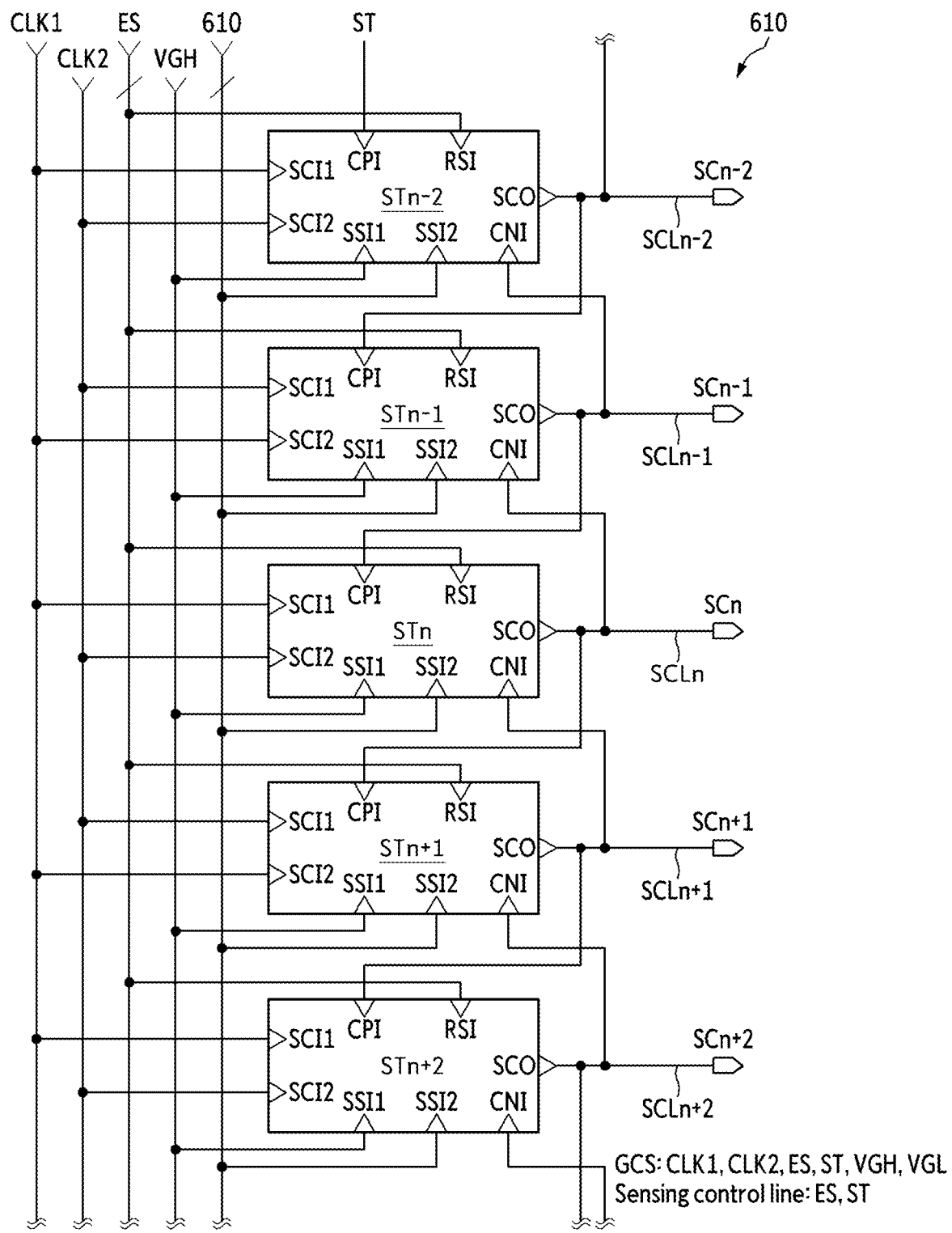
FIG. 5 is a view showing an example of a scan driver according to an embodiment of the present disclosure.

FIG. 5 is a view showing an example of a scan driver according to an embodiment of the present disclosure.

Referring to FIG. 5, the scan driver 610 according to the embodiment includes a plurality of stages cascaded together, i.e., the $n^{th}$ stages STn, where n is a positive integer.

In FIG. 5, only the $(n-2)^{th}$ to $(n+2)^{th}$ stages ST(n-2) to ST(n+2) are shown among stages for convenience of illustration.

In the following description, previous stages refer to the stages located before the $n^{th}$ stage STn. The subsequent stages refer to the stages located after the $n^{th}$ stage STn. For example, the previous stages of the $n^{th}$ stage STn refer to the $(n-1)^{th}$ stage ST(n-1), while the subsequent stages of the $n^{th}$ stage STn refer to the $(n+1)^{th}$ stage ST(n+1).

Scan clock lines from which scan clock signals CLK1 and CLK2 having sequentially delayed or alternating phases are applied, and sensing control lines from which a start signal ST, a line select signal ES and a reset signal are applied may be disposed on one side of the $(n-2)^{th}$ to the $(n+2)^{th}$ stages ST(n-2) to ST(n+2).

The scan clock signals CLK1 and CLK2, the line select signal ES, the start signal ST and the reset signals may be gate control signals GCS that are generated from the display driver 200 and transmitted through the first gate control lines GSL1. Although two scan clock lines, two sensing control lines, and two voltage lines are shown as the first gate control lines GSL1 in FIG. 5, the number of scan clock lines and sensing control lines is not limited thereto.

The scan driver 610 includes the $(n-2)^{th}$ to the $(n+2)^{th}$ stages ST(n-2) to ST(n+2) connected to the first gate control lines GSL1, where n is a positive integer. The $(n-2)^{th}$ stage ST(n-2) outputs the $(n-2)^{th}$ scan signal SC(n-2) to the $(n-2)^{th}$ scan signal line SCL(n-2), and the $(n-1)^{th}$ stage ST(n-1) outputs the $(n-1)^{th}$ scan signal SC(n-1) to the $(n-1)^{th}$ scan signal line SCL(n-1). Accordingly, the $n^{th}$ stage STn may output the $n^{th}$ scan signal SCn to the $n^{th}$ scan signal line SCLn. Subsequently, the $(n+1)^{th}$ stage ST(n+1) outputs the $(n+1)^{th}$ scan signal SC(n+1) to the $(n+1)^{th}$ scan signal line SCL(n+1), and the $(n+2)^{th}$ stage ST(n+2) outputs the $(n+2)^{th}$ scan signal SC(n+2) to the $(n+2)^{th}$ scan signal line SCL(n+2).

Each of the $(n-2)^{th}$ to the $(n+2)^{th}$ stages ST(n-2) to ST(n+2) includes a previous-stage carry terminal CPI, a subsequent-stage carry terminal CNI, a first scan clock terminal SCI1, a second scan clock terminal SCI2, a first power supply terminal SSI1, a second power supply terminal SSI2, a sensing signal terminal RSI, and a scan output terminal SCO.

When the $(n-2)^{th}$ stage ST(n-2) is the first stage, the start signal ST may be input to the previous-stage carry terminal CPI of the $(n-2)^{th}$ stage ST(n-2) through a start signal line. Each of the stages which are cascaded after the first stage may have a previous stage carry terminal CPI connected to a scan output terminal SCO of the immediately previous stage. For example, as shown in FIG. 5, the previous carry terminal CPI of the $n^{th}$ stage STn may be connected to the scan output terminal SCO of the $(n-1)^{th}$ stage ST(n-1).

The subsequent carry terminal CNI of each of the $(n-2)^{th}$ to the $(n+2)^{th}$ stages ST(n-2) to ST(n+2) may be connected to the scan output terminal SCO of one of the subsequent stages. For example, as shown in FIG. 5, the subsequent-stage carry terminal CNI of the $n^{th}$ stage STn may be connected to the scan output terminal SCO of the $(n+1)^{th}$ stage ST(n+1), and may receive the scan signal SC(n+1) of the $(n+1)^{th}$ stage ST(n+1) as the subsequent-stage carry signal.

The scan output terminals SCO of the $(n-2)^{th}$ to the $(n+2)^{th}$ stages ST(n-2) to ST(n+2) are sequentially connected to the scan signal lines SCL which are the respective gate lines GL. Accordingly, the scan signal lines SCL may be connected to the scan output terminals SCO of the stages ST(n-2) to ST(n+2), respectively. For example, the $(n-1)^{th}$ scan signal line SCL(n-1) is connected to the scan output terminal SCO of the $(n-1)^{th}$ stage ST(n-1), and the $n^{th}$ scan signal line SCLn is connected to the scan output terminal SCO of the $n^{th}$ stage STn. In addition, the $(n+1)^{th}$ scan signal line SCL(n+1) may be connected to the scan output terminal SCO of the $(n+1)^{th}$ stage ST(n+1).

The sensing signal terminal RSI of each of the $(n-2)^{th}$ to the $(n+2)^{th}$ stages ST(n-2) to ST(n+2) receives the line select signal ES through the sensing control line on which the line select signal ES is applied.

Each of the $(n-2)^{th}$ to the $(n+2)^{th}$ stages ST(n-2) to ST(n+2) sequentially or alternately receives two scan clock signals having sequentially delayed or alternating phases, i.e., first and second scan clock signals CLK1 and CLK2 through the first scan clock terminal SCI1 and the second scan clock terminal SCI2.

For example, each of the $(n-2)^{th}$ to the $(n+2)^{th}$ stages ST(n-2) to ST(n+2) may receive the first scan clock signal CLK1 through the first scan clock terminal SCI1, and may receive the second scan clock signal CLK2 having phases that are alternating with the first scan clock signal CLK1 or delayed phase through the second scan clock terminal SCI2.

The $(n-2)^{th}$ to the $(n+2)^{th}$ stages ST(n-2) to ST(n+2) sequentially output scan signals SC(n-2) to SC(n+2) to the respective scan signal lines SCL(n-2) to SCL(n+2) connected thereto through their scan output terminals SCO. For example, during at least one frame, the (n-2)th stage ST(n-2) outputs the $(n-2)^{th}$ scan signal SC(n-2) to the $(n-2)^{th}$ scan signal line SCL(n-2) connected to the scan output terminal SCO. Subsequently, the $(n-1)^{th}$ stage ST(n-1) outputs the $(n-1)^{th}$ scan signal SC(n-1) to the $(n-1)^{th}$ scan signal line SCL(n-1) connected to the scan output terminal SCO. Accordingly, the $n^{th}$ stage STn outputs the $n^{th}$ scan signal SCn to the $n^{th}$ scan signal line SCLn connected to the scan output terminal SCO. Subsequently, the $(n+1)^{th}$ stage ST(n+1) outputs the $(n+1)^{th}$ scan signal SC(n+1) to the $(n+1)^{th}$ scan signal line SCL(n+1) connected to the scan output terminal SCO, and the $(n+2)^{th}$ stage ST(n+2) outputs the (n+2)th scan signal SC(n+2) to the $(n+2)^{th}$ scan signal line SCL(n+2) connected to the scan output terminal SCO.

The structure of the emission control driver 620, which sequentially generates and outputs emission signals in response to the emission control signal ECS received from the display driver 200, may also have the $(n-2)^{th}$ to the $(n+2)^{th}$ stages ST(n-2) to ST(n+2). Therefore, the structure of the emission control driver 620 will not be described in detail in order to avoid the redundancy.

Figure 6:
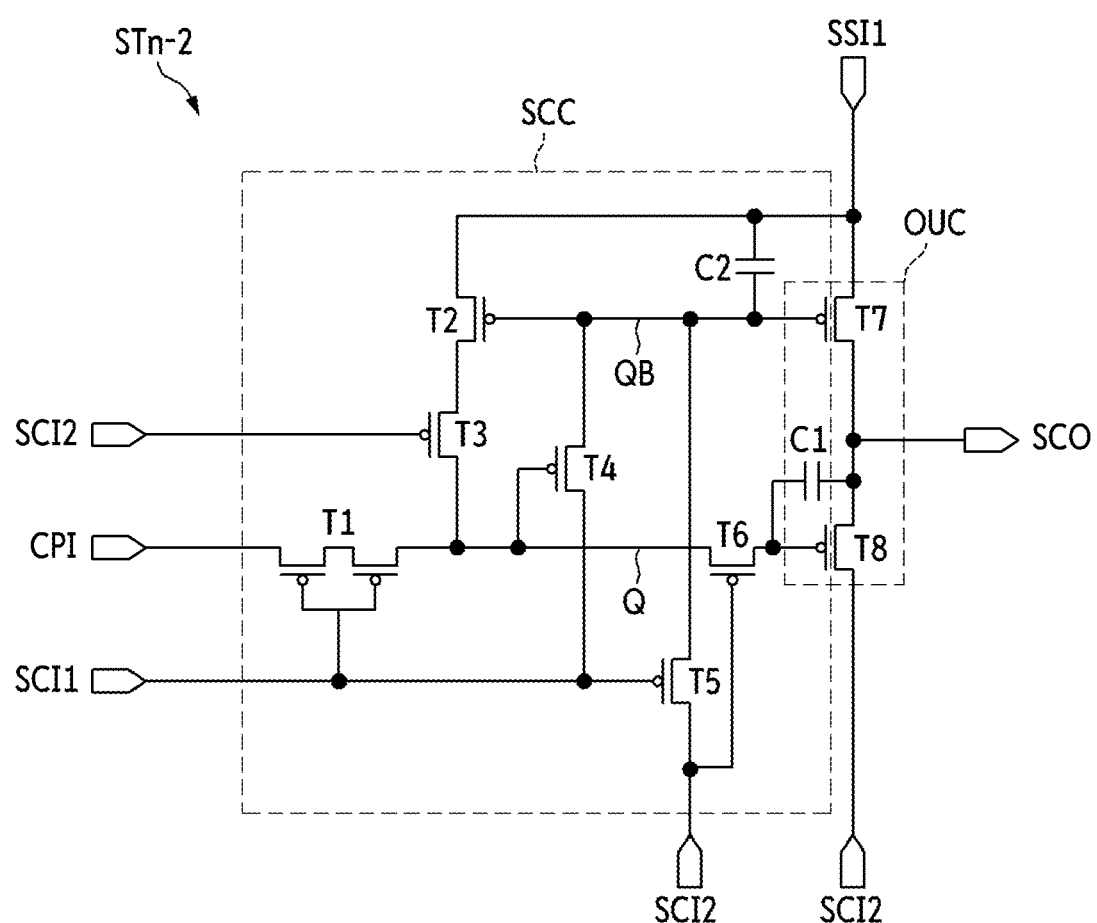
FIG. 6 is a circuit diagram showing the (n−2)$^{th}$ stage of the scan driver according to the embodiment shown in FIG. 5.

FIG. 6 is a circuit diagram of the $(n-2)^{th}$ stage of the scan driver 610 according to the embodiment shown in FIG. 5. Specifically, FIG. 6 shows an example of the $(n-2)^{th}$ stage ST(n-2) applied as the first stage among the $(n-2)^{th}$ to the $(n+2)^{th}$ stages ST(n-2) to ST(n+2) of the scan driver 610. When the $(n-2)^{th}$ stage ST(n-2) is the first stage, the start signal ST may be input to the previous-stage carry terminal CPI of the $(n-2)^{th}$ stage ST(n-2) through a start signal line.

The $(n-2)^{th}$ stage ST(n-2) includes an output node controller SCC including first to sixth transistors T1 to T6 and first and second capacitors C1 and C2, and an output controller OUC including seventh and eighth transistors T7 and T8. In addition, the $(n-2)^{th}$ stage ST(n-2) may further include a first power supply terminal SSI1 through which a gate-off voltage (e.g., a high-level DC voltage) is applied, and a second power supply terminal SSI2 through which a gate-on voltage (e.g., a low-level DC voltage) is applied.

The $(n-2)^{th}$ stage ST(n-2) disposed as the first stage receives the start signal ST at the previous-stage carry terminal CPI to start an operation. If the $(n-2)^{th}$ stage ST(n-2) is cascaded to the previous stage, for example, $(n-3)^{th}$ stage, it may operate by receiving the $(n-3)^{th}$ scan signal of the previous stage as a carry signal. An example in which the $(n-2)^{th}$ stage ST(n-2) of FIG. 6 is the first stage will be described.

The output node controller of the $(n-2)^{th}$ stage ST(n-2) activates the pull-up node Q and the pull-down node QB. The output node controller of the $(n-2)^{th}$ stage ST(n-2) allows a voltage equal to the gate-on voltage to be applied to the pull-up node Q and the pull-down node QB in a first period (e.g., charging period) of the active period of each frame. At this time, the output controller including the seventh and eighth transistors T7 and T8 is enabled. In the first period of the active period, the pull-up node Q and the pull-down node QB are enabled with the gate-on voltage, a gate-off voltage is applied to the seventh transistor T7 of the output controller, and the second scan clock signal CLK2 at the gate-off voltage level is applied to the eighth transistor T8. Accordingly, the gate-off voltage is output to the $(n-2)^{th}$ scan signal line SCL(n-2) during the first period, which is the charging period of the pull-up node Q.

The output node controller of the $(n-2)^{th}$ stage ST(n-2) maintains the pull-up node Q enabled and the pull-down node QB floating or disabled with the gate-off voltage in a second period (e.g., scan output period) of the active period of each frame. In the second period, which is the scan output period, as the second scan clock signal CLK2 at the gate-on voltage level is applied to the eighth transistor T8, the $(n-2)^{th}$ scan signal SC(n-2) at the gate-on voltage level is output to the $(n-2)^{th}$ scan signal line SCL(n-2) through the eighth transistor T8.

Specifically, in the first period of the active period, the line select signal ES, the start signal ST and the first scan clock signal CLK1 are provided at the gate-on voltage level. Accordingly, the output node controller of the $(n-2)^{th}$ stage ST(n-2) allows the pull-up node Q and the pull-down node QB to be enabled and the gate-off voltage to be output to the (n-2)th scan signal line SCL(n-2) in response to the start signal ST and the first scan clock signal CLK1 input during the first period of the active period. In addition, in the second period, the second scan clock signal CLK2 is provided at the gate-on voltage level. Accordingly, in the second period, the output node controller maintains the pull-up node Q enabled in response to the second scan clock signal CLK2, so that the $(n-2)^{th}$ scan signal SC(n-2) according to the second scan clock signal CLK2 is output to the $(n-2)^{th}$ scan signal line SCL(n-2).

The seventh transistor T7 of the output controller is turned on when the pull-down node QB is enabled, and outputs the gate-off voltage of the first power supply terminal SSI1 to the $(n-2)^{th}$ scan signal line SCL(n-2). Then, the seventh transistor T7 may be turned off when the pull-down node QB is floating or disabled.

The eighth transistor T8 of the output controller is turned on during the first period when the pull-up node Q is enabled, and provides the gate-off voltage according to the second scan clock signal CLK2 to the $(n-2)^{th}$ scan signal line SCL(n-2). Then, in the second period when the pull-down node QB is changed to a floating state and the seventh transistor T7 is turned off, the eighth transistor T8 provides the gate-on voltage according to the second scan clock signal CLK2 to the $(n-2)^{th}$ scan signal line SCL(n-2) as the $(n-2)^{th}$ scan signal SC(n-2).

As described above, the $(n-2)^{th}$ to the $(n+2)^{th}$ stages ST(n-2) to ST(n+2) repeat operations of sequentially outputting scan signals to the respective scan signal lines and then maintaining the respective scan signal lines at the gate-off voltage.

The first to sixth transistors T1 to T6 of the output node controller included in each of the $(n-2)^{th}$ to the $(n+2)^{th}$ stages ST(n-2) to ST(n+2) include first and second electrodes in addition to the gate electrode. One of the first electrode and the second electrode may be a source electrode, and the other may be a drain electrode. The first capacitor C1 of the output node controller maintains the turn-on period of the eighth transistor T8, and the second capacitor C2 thereof maintains the turn-on period of the seventh transistor T7.

The first transistor T1 of the $(n-2)^{th}$ stage ST(n-2) disposed as the first stage of the scan driver 610 may be formed as a thin-film transistor having a double-gate structure or a dual-gate structure. Herein, the double-gate structure refers to a structure in which gate electrodes are separately disposed on the front and rear side (or top and bottom) of the active layer in the thickness direction of a thin-film transistor. The dual-gate structure refers to a structure in which two thin-film transistors arranged adjacent to each other share the same gate electrode and are connected in series. It should be noted that the first transistor T1 formed in each of the $(n-1)^{th}$ to the $(n+2)^{th}$ stages ST(n-1) to ST(n+2) subsequent to the $(n-2)^{th}$ stage ST(n-2) which is the first stage may be formed as a thin-film transistor having a single-gate structure.

Among the $(n-2)^{th}$ to the $(n+2)^{th}$ stages ST(n-2) to ST(n+2), the gate electrode of the first transistor T1 of each of the odd-numbered stages is connected to the first scan clock terminal SCI1, and the first electrode thereof is connected to the previous-stage carry terminal CPI. The second electrode thereof is connected to the pull-up node Q. On the other hand, among the $(n-2)^{th}$ to the $(n+2)^{th}$ stages ST(n-2) to ST(n+2), the gate electrode of the first transistor T1 of each of the even-numbered stages is connected to the second scan clock terminal SCI2.

The first transistor T1 of each of the odd-numbered stages is turned on in response to the first scan clock signal CLK1 of the first scan clock terminal SCI1, and provides the start signal ST or the carry signal from the previous-stage carry terminal CPI to the pull-up node Q. On the other hand, the first transistor T1 of each of the even-numbered stages is turned on in response to the second scan clock signal CLK2 of the second scan clock terminal SCI2, and provides the start signal ST or the carry signal from the previous-stage carry terminal CPI to the pull-up node Q.

As described above, the first transistor T1 of the $(n-2)^{th}$ stage ST(n-2) disposed as the first stage of the scan driver 610 may be formed as a thin-film transistor having a double-gate structure or a dual-gate structure. The first transistor T1 formed in each of the other $(n-1)^{th}$ to the $(n+2)^{th}$ stages ST(n-1) to ST(n+2) that is sequentially connected to the subsequent stage may be formed as a thin-film transistor having a single-gate structure.

The gate electrode of the second transistor T2 is connected to the pull-down node QB, the first electrode thereof is connected to the first power supply terminal SSI1, and the second electrode thereof is connected to the first electrode of the third transistor T3. The second transistor T2 is turned on when the pull-down node QB is enabled by the gate-on voltage to electrically connect the first power supply terminal SSI1 with the first electrode of the third transistor T3.

Among the $(n-2)^{th}$ to the $(n+2)^{th}$ stages ST(n-2) to ST(n+2), the gate electrode of the third transistor T3 of each of the odd-numbered stages is connected to the second scan clock terminal SCI2, the first electrode thereof is connected to the second electrode of the second transistor T2, and the second electrode thereof is connected to the pull-up node Q. The third transistor T3 included in each of the odd-numbered stages is turned on by the second scan clock signal CLK2 input to the second scan clock terminal SCI2 to electrically connect the second electrode of the second transistor T2 with the pull-up node Q. Accordingly, the third transistor T3 may electrically connect the pull-up node Q with the first power supply terminal SSI1 through the second transistor T2 in response to the second scan clock signal CLK2.

On the other hand, among the $(n-2)^{th}$ to the $(n+2)^{th}$ stages ST(n-2) to ST(n+2), the gate electrode of the first transistor T1 of each of the even-numbered stages is connected to the second scan clock terminal SCI2. Accordingly, the third transistor T3 included in each of the even-numbered stages is turned on by the first scan clock signal CLK1 input to the first scan clock terminal SCI1 to electrically connect the second electrode of the second transistor T2 with the pull-up node Q.

The gate electrode of the fourth transistor T4 is connected to the pull-up node Q, the first electrode thereof is connected to the first scan clock terminal SCI1, and the second electrode thereof is connected to the pull-down node QB. The fourth transistor T4 is turned on when the pull-up node Q is enabled by the gate-on voltage, and electrically connects the first or second scan clock terminals SCI1 and SCI2 with the pull-down node QB. Accordingly, in the second period, the fourth transistor T4 may disable the pull-down node QB to the voltage level of the first or second scan clock terminals SCI1 and SCI2 or change it to a floating state. Only in the second period, the pull-down node QB is changed to the gate-off voltage and the seventh transistor T7 is turned off.

Among the $(n-2)^{th}$ to the $(n+2)^{th}$ stages ST(n-2) to ST(n+2), the gate electrode of the fifth transistor T5 of each of the odd-numbered stages is connected to the first scan clock terminal SCI1, the first electrode thereof is connected to the second power supply terminal SSI2, and the second electrode thereof is connected to the pull-down node QB. The fifth transistor T5 is turned on in response to the first scan clock signal CLK1 to electrically connect the second power supply terminal SSI2 with the pull-down node QB. Accordingly, the fifth transistor T5 may enable the pull-down node QB at the gate-on voltage level in response to the first scan clock signal CLK1.

On the other hand, among the $(n-2)^{th}$ to the $(n+2)^{th}$ stages ST(n-2) to ST(n+2), the gate electrode of the fifth transistor T5 of each of the even-numbered stages is connected to the second scan clock terminal SCI2. Accordingly, the fifth transistor T5 of each of the even-numbered stages is turned on in response to the second scan clock signal CLK2 to electrically connect the second power supply terminal SSI2 with the pull-down node QB.

The gate electrode of the sixth transistor (T6) is connected to the second power supply terminal (SSI2), the first electrode thereof is connected to the pull-up node Q, and the second electrode thereof is connected to the gate electrode of the eighth transistor T8 which operates as a pull-up transistor of the output controller. The sixth transistor T6 is turned on by the gate-on voltage input to the second power supply terminal SSI2 and electrically connects the pull-up node Q with the gate electrode of the eighth transistor T8.

The output controller of each of the $(n-2)^{th}$ to the $(n+2)^{th}$ stages ST(n-2) to ST(n+2) includes a seventh transistor T7 operating as a pull-down transistor and an eighth transistor T8 operating as a pull-up transistor.

The gate electrode of the seventh transistor T7, which operates as a pull-down transistor of the output controller, is connected to the pull-down node QB, the first electrode thereof is connected to the first power supply terminal SSI1 at which the gate-off voltage is applied, and the second electrode thereof is connected to the scan output terminal SCO. Herein, the second capacitor C2 adjusts the turn-on period of the seventh transistor T7.

The seventh transistor T7 is turned on during the enable period of the pull-down node QB to electrically connect the first power supply terminal SSI1 with the scan output terminal SCO. The seventh transistor T7 may transmit the gate-off voltage of the first power supply terminal SSI1 to the scan output terminal SCO during the turn-on period of the seventh transistor T7. Accordingly, the $(n-2)^{th}$ scan signal line SCL(n-2) connected to the scan output terminal SCO may be maintained at the gate-off voltage during the turn-on period of the seventh transistor T7.

The gate electrode of the eighth transistor T8, which operates as a pull-up transistor in the output controller of each of the odd-numbered stages among the $(n-2)^{th}$ to the $(n+2)^{th}$ stages ST(n-2) to ST(+2), is connected to the pull-up node Q by the sixth transistor normally turned on. Additionally, the first electrode of the eighth transistor T8 is connected to the second scan clock terminal SCI2 and the second electrode thereof is connected to the scan output terminal SCO.

The eighth transistor T8 of each of the odd-numbered stages is turned on during the enable period when the gate-on voltage is applied to the pull-up node Q, to electrically connect the second scan clock terminal SCI2 with the scan output terminal SCO. The eighth transistor T8 may transmit the second scan clock signal CLK2 input at the second scan clock terminal SCI2 to the scan output terminal SCO during the turn-on period of the eighth transistor T8. Accordingly, the $(n-2)^{th}$ scan signal SC(n-2) of the gate-on voltage may be provided to the $(n-2)^{th}$ scan signal line SCL(n-2).

On the other hand, the first electrode of the eighth transistor T8, which operates as a pull-up transistor in the output controller of each of the even-numbered stages, is connected to the first scan clock terminal SCI1, and the second electrode thereof is connected to the scan output terminal SCO. Accordingly, the eighth transistor T8 of each of the even-numbered stages is turned on during the enable period when the gate-on voltage is applied to the pull-up node Q, to transmit the first scan clock signal CLK1 to the scan output terminal SCO.

Each of the first to eighth transistors T1 to T8 may be formed as a PMOS transistor. It should be understood, however, that the embodiments of the present disclosure are not limited thereto. Each of the first to eighth transistors T1 to T8 may be formed as an NMOS transistor.

Figure 7:
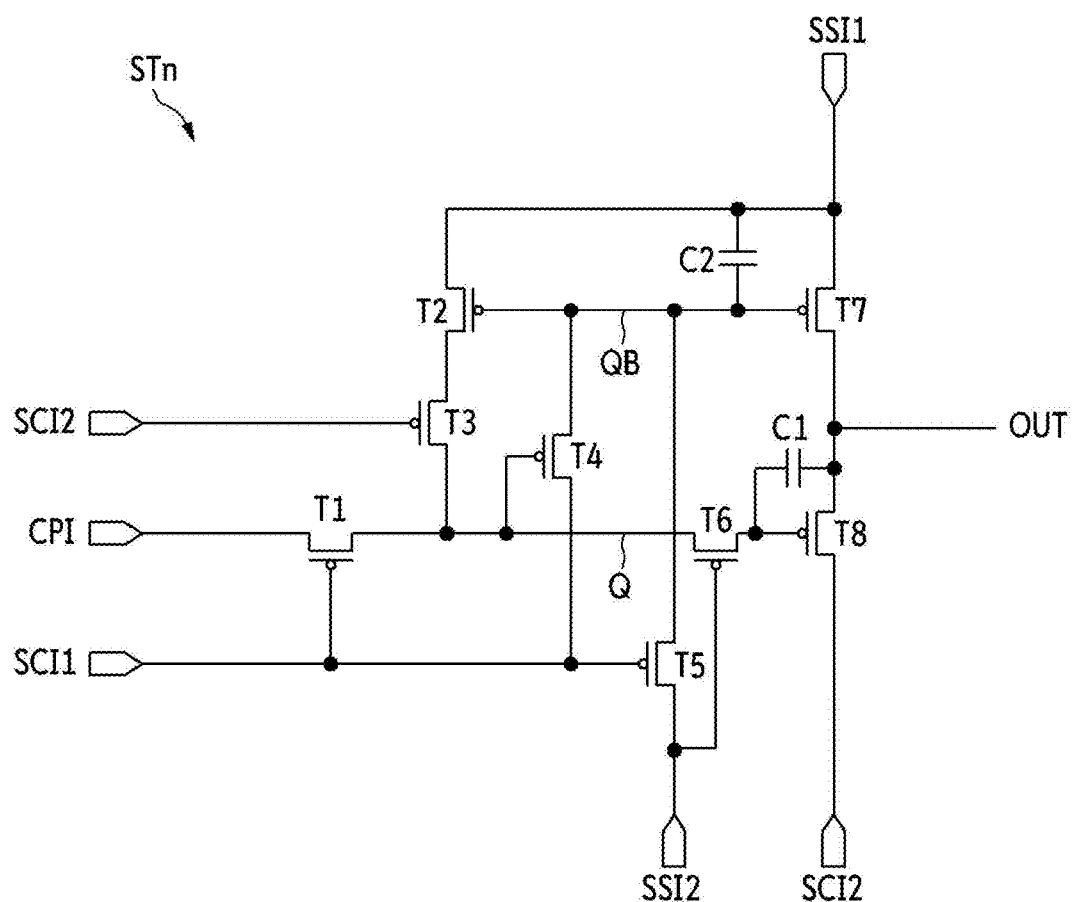
FIG. 7 is a circuit diagram showing the n$^{th}$ stage of the scan driver according to the embodiment shown in FIG. 5.

FIG. 7 is a circuit diagram showing the $n^{th}$ stage of the scan driver according to the embodiment shown in FIG. 5.

As described above with reference to FIG. 6, the first transistor T1 of the $(n-2)^{th}$ stage ST(n-2) disposed as the first stage of the scan driver 610 may be formed as a thin-film transistor having a double-gate structure or a dual-gate structure.

On the other hand, as shown in FIG. 7, the first transistors T1 included in the second to the last stages may be formed as thin-film transistors having a single-gate structure.

The first scan clock signals CLK1 are periodically provided to the gate electrode of the first transistor T1 having the single-gate structure disposed in each of the odd-numbered stages through the first scan clock terminal SCI1, and the first transistor T1 is repeatedly turned on and turned off by the first scan clock signal CLK1 provided periodically.

In addition, the second scan clock signals CLK2 are periodically provided to the gate electrode of the first transistor T1 having the single-gate structure disposed in each of the even-numbered stages through the second scan clock terminal SCI2, and the first transistor T1 is repeatedly turned on and turned off by the second scan clock signal CLK2 provided periodically.

As the first transistors T1 are repeatedly turned on and off, they continuously receive a voltage at the gate-off voltage level from the previous-stage carry terminal CPI connected to the first electrode. During the turn-on period, when the start signal ST or the previous-stage scan signal at the gate-on voltage level is provided from the previous-stage carry terminal CPI connected to the first electrode, the gate-on voltage is provided to the pull-up node Q. The first transistors T1 having the single-gate structure continuously repeat turn-on and turn-off operations by the first or second scan clock signals CLK1 and CLK2, and continuously receive a high-level voltage (e.g., 9 V) which is the gate-off voltage from the first electrode. In other words, the first transistors T1 continuously receive a high-level voltage (e.g., 9 V) during the periods other than the period when the gate-on voltage at a low-level (−9 V), i.e., the start signal ST or the previous-stage scan signal, is provided. Accordingly, the current and voltage characteristics of the semiconductor layer of the first transistors T1, such as the threshold voltage of the semiconductor layer (or active layer), may be changed due to the influence of high potential and high voltage stress.

When the current and voltage characteristics of the first transistors T1 are changed, the voltage and current output characteristics of the first transistors T1 deteriorate such that the output of each of the stages ST(n−2) to ST(n+2) may be reduced or the reliability may be deteriorated. Accordingly, the semiconductor layer (or active layer) for at least one transistor (for example, the first transistor T1) among the first to eighth transistors T1 to T8 of each stage STn may be made of a different type of oxide semiconductor material than the semiconductor layer (or active layer) of at least one of the other transistors T2 to T8.

For example, among the first to eighth transistors T1 to T8 of each stage STn, the semiconductor layer (or active layer) for the first, second and seventh transistors T1, T2 and T7 that receive the gate-off voltage at the high voltage level at the first or second electrode may contain a different type of oxide semiconductor than the semiconductor layer (or active layer) of at least one of the other transistors T3, T4, T5, T6 and T8. That is to say, among the first to eighth transistors T1 to T8 of each stage STn, the semiconductor layer (or active layer) of the first, second and seventh transistors T1, T2 and T7, which continuously receive the gate-off voltage at high voltage level at an electrode is made of a different type of oxide semiconductor material that increases the range of the current amount so that the current amount and the current transfer ratio can be increased.

Figure 8:
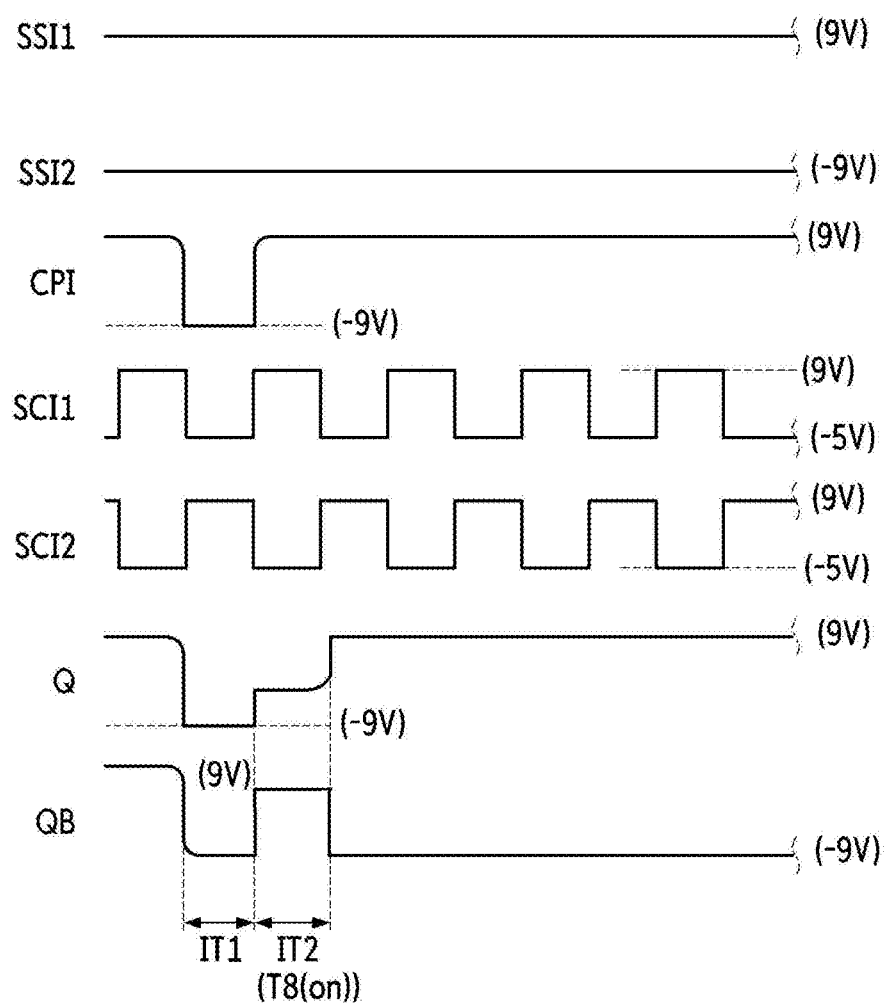
FIG. 8 is a waveform diagram showing sensing control clock signals, scan clock signals, and changes in voltage levels of a pull-up node and a pull-down node during an active period of the n$^{th}$ frame.

FIG. 8 is a waveform diagram showing sensing control clock signals, scan clock signals, and changes in voltage levels of a pull-up node and a pull-down node during an active period of the $n^{th}$ frame.

Referring to FIG. 8, during the active period when images are displayed through pixels PX in the display area DA, in a first period IT1 of each horizontal line driving period, a start signal ST or the previous-stage carry signal of the previous-stage gate terminal CPI, and the first scan clock signal CLK1 are provided at the gate-on voltage level (e.g., −9 V).

Accordingly, the output node controller of each stage STn enables the pull-up node Q and the pull-down node QB to the gate-on voltage in response to the start signal ST and the first scan clock signal CLK1 input in the first period of each horizontal line driving period, so that the gate-off voltage (e.g., 9 V) is output to the scan signal lines SCLn. At this time, the second transistor T2 is turned on when the pull-down node QB is enabled by the gate-on voltage to electrically connect the first power supply terminal SSI1 with the first electrode of the third transistor T3. The fourth transistor T4 is turned on when the pull-up node Q is enabled by the gate-on voltage, and electrically connects the first scan clock terminal SCI1 with the pull-down node QB. The seventh transistor T7 is turned on during the enable period of the pull-down node QB to electrically connect the first power supply terminal SSI1 with the scan output terminal SCO. The seventh transistor T7 may transmit the gate-off voltage of the first power supply terminal SSI1 to the scan output terminal SCO during the turn-on period.

Subsequently, in a second period IT2 of the horizontal line driving period, the second scan clock signal CLK2 is provided at the gate-on voltage (e.g., −9 V) level. While the pull-up node Q is enabled in the second period IT2, the sixth transistor T6 is turned on by the gate-on voltage input at the second power supply terminal SSI2 and electrically connects the pull-up node Q with the gate electrode of the eighth transistor T8. The eighth transistor T8 of each of the odd-numbered stages transmits the second scan clock signal CLK2 input at the second scan clock terminal SCI2 to the scan output terminal SCO during the turn-on period. Accordingly, the $(n-2)^{th}$ scan signal SC(n−2) of the gate-on voltage may be provided to the $(n-2)^{th}$ scan signal line SCL(n−2).

On the other hand, the eighth transistor T8 of each of the even-numbered stages transmits the first scan clock signal CLK1 input at the first scan clock terminal SCI1 to the scan output terminal SCO during the turn-on period. Accordingly, the $(n-1)^{th}$ scan signal SC(n−1) of the gate-on voltage may be provided to the $(n-1)^{th}$ scan signal line SCL(n−1), etc.

In the remaining horizontal period after the second period IT2, the pull-up node Q is disabled by the start signal ST or the previous-stage carry signal at the gate-off voltage level. On the other hand, while the seventh transistor T7 is turned on by the pull-down node OB remaining enabled, the seventh transistor T7 provides the gate-off voltage (e.g., 9 V) of the first power supply terminal SSI1 to the scan output terminal SCO.

Figure 9:
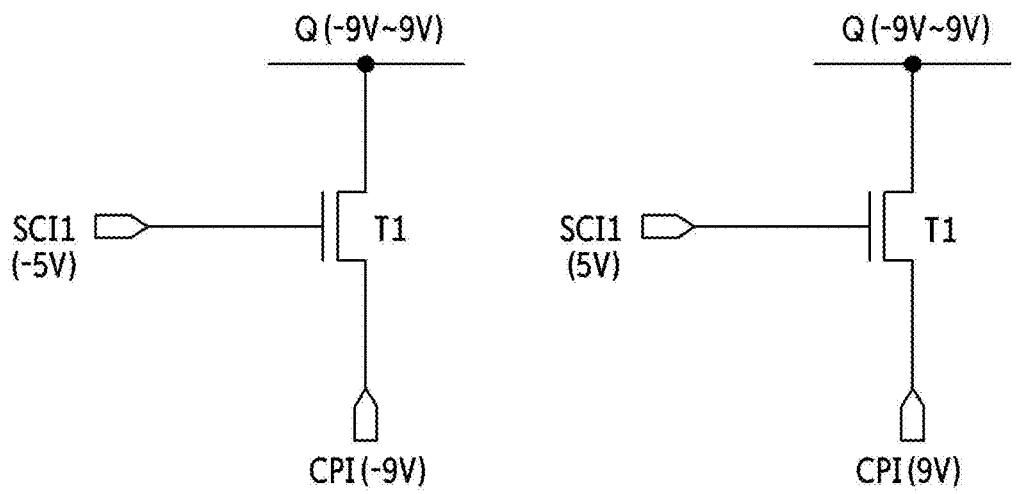
FIG. 9 is a circuit diagram showing changes in the voltage difference between the gate electrode and the first and second electrodes of the first transistor shown in FIGS. 6 and 7.

FIG. 9 is a circuit diagram showing changes in the voltage difference between the gate electrode and the first and second electrodes of the first transistor shown in FIGS. 6 and 7.

Referring to FIG. 9, the first transistor T1 of each of the odd-numbered stages excluding the first stage is formed in a single-gate structure. The gate electrode of the single-gate structure is connected to the first scan clock terminal SCI1. The first electrode of the first transistor T1 is connected to the previous-stage carry terminal CPI, and the second electrode of the first transistor T1 is connected to the pull-up node Q.

On the other hand, the first transistors T1 of the even-numbered stages are all formed in a single-gate structure, and the gate electrode thereof is connected to the second scan clock terminal SCI2. Likewise, the first electrode of the first transistor T1 is connected to the previous-stage carry terminal CPI, and the second electrode of the first transistor T1 is connected to the pull-up node Q.

The first transistor T1 having the single-gate structure is turned on in response to the first or second scan clock signal CLK1 or CLK2 of the first or second scan clock terminal SCI1 or SCI2, and provides the start signal ST or the gate-on voltage of the previous-stage carry terminal CPI according to the previous-stage scan signal to the pull-up node Q when the first transistor T1 is turned on.

The gate-on voltage according to the start signal ST or the previous-stage scan signal of the previous-stage carry terminal CPI may be provided at the voltage level of −9 V. The gate-off voltage according to the start signal ST or the previous-stage scan signal may be provided at the voltage level of 9 V.

The first transistor T1 having the single-gate structure may be turned on or turned off in response to the first or second scan clock signal CLK1 or CLK2 with an amplitude greater than the gate-on voltage provided to the first electrode and less than the gate-off voltage.

The first and second scan clock signals CLK1 and CLK2 repeatedly swing between a first voltage that is greater than the voltage level of the start signal ST or the previous scan signal having the gate-on voltage level or the voltage level of the scan signal output on the scan signal line, and a second voltage that is less than the voltage level of the start signal ST or the previous-stage scan signal having the gate-off voltage level or the voltage level of the scan signal output on the scan signal line. For example, the first and second scan clock signals CLK1 and CLK2 may be generated such that they repeatedly swing between the first voltage of +5 V and the second voltage of −5 V.

Figure 10:
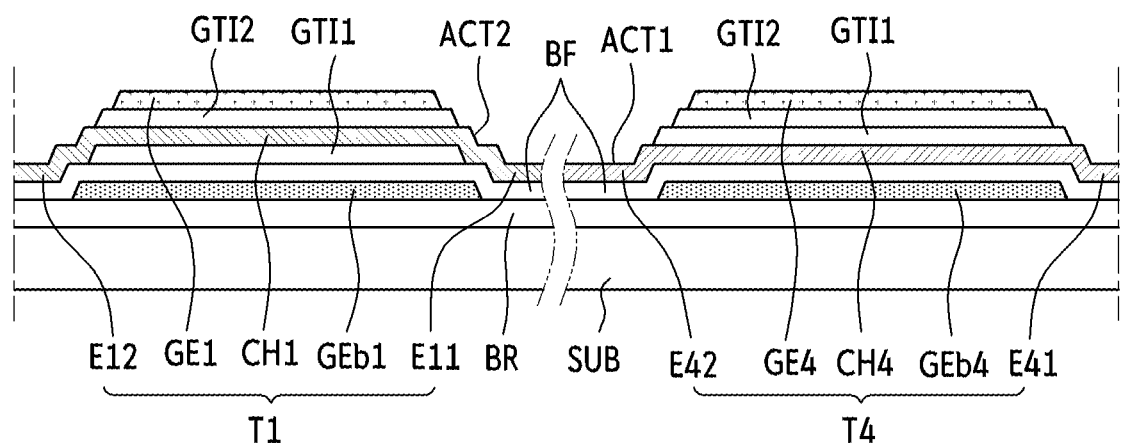
FIG. 10 is a cross-sectional view showing the cross-sectional structure of the first and fourth transistors of the scan driver shown in FIGS. 6 and 7.

FIG. 10 is a cross-sectional view showing the cross-sectional structure of the first and fourth transistors of the scan driver shown in FIGS. 6 and 7.

As described above, among the first to eighth transistors T1 to T8 of each stage STn, the semiconductor layer (or active layer) for the first, second and seventh transistors T1, T2 and T7 that receive the gate-off voltage at the high voltage level at the first or second electrode may contain a different type of oxide semiconductor than the semiconductor layer (or active layer) of at least one of the other transistors T3, T4, T5, T6 and T8. That is to say, among the first to eighth transistors T1 to T8 of each stage STn, the semiconductor layer (or active layer) of the first, second and seventh transistors T1, T2 and T7, which continuously receive the gate-off voltage at high voltage level at an electrode is made of a different type of oxide semiconductor material that increases the range of the current amount, so that the current amount and the current transfer ratio can be increased.

Referring to FIGS. 7 and 10, among the plurality of transistors T1 to T8 included in each stage STn, the transistors T3, T4, T5, T6 and T8 other than the first, second and seventh transistors T1, T2 and T7 including a first active layer ACT1 containing an oxide semiconductor.

In contrast, among the transistors T1 to T8 included in each stage STn, at least one transistor, e.g., the first, second and seventh transistors T1, T2 and T7, which continuously receive the gate-off voltage of high-level at the first or second electrode includes the second active layer ACT2 containing a different type of oxide semiconductor than the oxide semiconductor of the first active layer ACT1.

Specifically, a barrier layer BR is formed on the substrate SUB where each stage STn is formed, and a thin-film transistor layer TFTL including a plurality of transistors T1 to T8 for each stage STn is formed the barrier layer BR.

The substrate SUB may be a rigid substrate or a flexible substrate that can be bent, folded, rolled, and so on. The substrate SUB may be made of an insulating material such as glass, quartz and a polymer resin. Examples of the polymer material may include polyethersulphone (PES), polyacrylate (PA), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP) or a combination thereof. Alternatively, the first substrate SUB may include a metal material.

The barrier layer BR may be disposed on the substrate SUB. The barrier layer BR may be a film for protecting the thin-film transistor layer TFTL from moisture permeating through the substrate SUB, which is vulnerable to permeation of moisture. The barrier layer BR may include multiple inorganic layers stacked on one another alternately. For example, the barrier layer BR may include multiple layers in which one or more inorganic layers of a silicon nitride layer, a silicon oxynitride layer, a silicon oxide layer, a titanium oxide layer and an aluminum oxide layer are alternately stacked on one another.

The thin-film transistor layer TFTL including a plurality of transistors T1 to T8 for each stage STn is formed on the barrier layer BR.

The transistors T3, T4, T5, T6 and T8 other than the first, second and seventh transistors T1, T2 and T7, for example, the thin-film transistor layer TFTL of the fourth transistor T4 includes a first gate electrode GEb4, an interlayer dielectric layer BF, a first active layer ACT1, first and second gate insulators GTI1 and GTI2, and a second gate electrode GE4.

The interlayer dielectric layer BF is formed to cover the first gate electrode GEb4 disposed on the barrier layer BR.

The first active layer ACT1 is formed to cover the first gate electrode GEb4 with the interlayer dielectric layer BF interposed therebetween, thereby forming a fourth channel region CH4. A first electrode E41 and a second electrode E42 may be defined on one side and the other side of the first active layer ACT1, respectively.

A first gate insulator GTI1 is formed to overlap the first gate electrode GEb4 with the first active layer ACT1 interposed therebetween, and a second gate insulator GTI2 is formed to overlap the first gate electrode GEb4 with the first gate insulator GTI1 interposed therebetween.

The second gate electrode GE4 is formed to overlap the first gate electrode GEb4 with the first and second gate insulators GTI1 and GTI2 interposed therebetween.

An interlayer dielectric layer BF may include an inorganic layer, for example, a silicon nitride layer, a silicon oxynitride layer, a silicon oxide layer, a titanium oxide layer, or an aluminum oxide layer. The interlayer dielectric layer BF may include a number of inorganic layers.

The first active layer ACT1 may include a material such as polycrystalline silicon, single crystal silicon, low-temperature polycrystalline silicon, amorphous silicon and an oxide semiconductor. When the first active layer ACT1 includes an oxide semiconductor material, the first active layer ACT1 may include indium-gallium-zinc-oxide (IGZO).

When the first active layer ACT1 includes polycrystalline silicon or an oxide semiconductor material, the source region and the drain region of the first active layer ACT1 may be doped with impurities and thus may be conductive regions.

The first gate insulator GTI1 may include at least one of tetraethoxysilane (TetraEthyl OrthoSilicate, TEOS), silicon nitride (SiNx), and silicon oxide ($SiO_2$). For example, the first gate insulator GTI1 may have a double layer structure in which a silicon nitride layer having the thickness of 40 nm and a tetraethoxysilane layer having the thickness of 80 nm are stacked each another. The second gate insulator GTI2 may have the same material and structure as the first gate insulator GTI1 described above.

Among the plurality of transistors T1 to T8 included in each stage STn, the first, second and seventh transistors T1, T2 and T7, e.g., the first transistor T1 includes a second active layer ACT2 containing a different type of oxide semiconductor than the oxide semiconductor of the first active layer ACT1.

For example, the thin-film transistor layer TFTL of the first transistor T1 includes the first gate electrode GEb1, the interlayer dielectric layer BF, the second active layer ACT2, the first and second gate insulators GTI1 and GTI2, and the second gate electrode GE1.

The interlayer dielectric layer BF is formed to cover the first gate electrode GEb1 disposed on the barrier layer BR.

The second active layer ACT2 is formed to cover the first gate electrode GEb1 with the interlayer dielectric layer BF interposed therebetween, thereby forming a first channel region CH1. The first electrode E11 and the second electrode E12 may be defined on one side and the other side of the second active layer ACT2, respectively.

The first gate insulator GTI1 is formed to overlap the first gate electrode GEb1 with the second active layer ACT2 interposed therebetween, and the second gate insulator GTI2 is formed to overlap the first gate electrode GEb1 with the first gate insulator GTI1 interposed therebetween.

The second gate electrode GE1 is formed to overlap the first gate electrode GEb1 with the first and second gate insulators GTI1 and GTI2 interposed therebetween.

The second active layer ACT2 may include a different type of oxide semiconductor material than the first active layer ACT1. For example, when the above-described first active layer ACT1 is an oxide semiconductor containing indium-gallium-zinc-oxide (IGZO), the second active layer ACT2 may be an oxide semiconductor containing indium-gallium-zinc-tin-oxide (IGZTO). When the second active layer ACT2 includes a heterogeneous oxide semiconductor material, the source region and the drain region of the second active layer ACT2 may be doped with impurities and thus may be conductive regions.

It should be noted that since the first active layer ACT1 and the second active layer ACT2 are semiconductor layers of different materials, the first active layer ACT1 and the second active layer ACT2 may be formed on the substrate via different processes.

The third to sixth, and eighth transistors T3, T4, T5, T6 and T8, which are transistors requiring fast switching speed, may include the first active layer ACT1 of indium-gallium-zinc-oxide (IGZO).

However, each of the first, second and seventh transistors T1, T2 and T7, which require a wide range of current transfer ratio and high reliability, may include the second active layer made of indium-gallium-zinc-tin-oxide (IGZTO). In other words, each of the first, second and seventh transistors T1, T2 and T7, which are directly connected to the pull-up node Q and require high reliability, may include a different type of oxide semiconductor material. Accordingly, high reliability as well as high speed of each stage STn can be achieved.

In concluding the detailed description, those skilled in the art will appreciate that many variations and modifications can be made to the preferred embodiments without substantially departing from the principles of the present disclosure. Therefore, the disclosed embodiments of the disclosure are used in a generic and descriptive sense only and not for purposes of limitation.

What is claimed is:

1. A scan driver comprising:
stages configured to sequentially output scan signals to scan signal lines during an active period of an nth frame, respectively, where n is a positive integer,
wherein at least one stage among the stages comprises:
an output node controller configured to apply a gate-on voltage to a pull-up node in response to a gate control signal from a display driver; and
an output controller configured to output a scan clock signal input from a scan clock terminal as a scan signal to each of the scan signal lines connected thereto when the gate-on voltage is applied to the pull-up node,
wherein the output node controller comprises a first transistor that enables the pull-up node with a start signal or a previous-stage scan signal input having a gate-on voltage level in response to a first or second scan clock signal, and
wherein the first transistor comprises a gate electrode connected to a first or second scan clock terminal, a first electrode connected to a previous-stage carry terminal, and a second electrode connected to the pull-up node.

2. The scan driver of claim 1, wherein the first transistor included in a first stage has a double-gate structure or a dual-gate structure, and
wherein the first transistor included in stages other than the first stage has a single-gate structure.

3. The scan driver of claim 1, wherein the output node controller enables a pull-down node or the pull-up node in response to the start signal and the first scan clock signal having the gate-on voltage level input in a first period of the active period,
wherein the output controller outputs a gate-off voltage to the scan signal line when the pull-down node is enabled, and maintains the pull-up node enabled in response to the gate-on voltage of the second scan clock signal input in a second period of the active period, and
wherein the output controller transmits the second scan clock signal having the gate-on voltage level to the scan signal line as the scan signal.

4. The scan driver of claim 3, wherein the output controller provides the gate-off voltage according to the second scan clock signal to the scan signal line in the first period when the pull-up node is enabled, and provides the gate-on voltage according to the second scan clock signal to the scan signal line as the scan signal in the second period when the pull-down node is floating.

5. The scan driver of claim 3, wherein the output node controller comprises:
a second transistor that is turned on when the pull-down node is enabled by the gate-on voltage to electrically connect a first power supply terminal with a first electrode of a third transistor;
the third transistor that is turned on by the first or second scan clock signal input to the first or second scan clock terminal to electrically connect a second electrode of the second transistor with the pull-up node;
a fourth transistor that is turned on when the pull-up node is enabled by the gate-on voltage to electrically connect the first or second scan clock terminal with the pull-down node so that the pull-down node is disabled or floating;

a fifth transistor that is turned on in response to the first or second scan clock signal to electrically connect a second power supply terminal with the pull-down node so that the pull-down node is changed to be enabled; and a sixth transistor that controls a scan output period of the pull-up node and the output controller while being turned on by the gate-on voltage input at the second power supply terminal.

6. The scan driver of claim 5, wherein the output controller comprises:
a seventh transistor that is turned on while the pull-down node is enabled to electrically connect the first power supply terminal with a scan output terminal to control the gate-off voltage of the first power supply terminal to be provided to the scan output terminal; and
an eighth transistor that is turned on while the pull-up node is enabled to transmit the gate-on voltage of the first or second scan clock terminal to the scan output terminal.

7. The scan driver of claim 6, wherein the eighth transistor comprises a first active layer containing an oxide semiconductor, and
wherein the seventh transistor comprises a second active layer containing a different type of oxide semiconductor than the oxide semiconductor of the first active layer.

8. The scan driver of claim 5, wherein, among the first to sixth transistors, at least one of the third, fourth and fifth transistors comprises a first active layer containing an oxide semiconductor, and
wherein, among the first to eighth transistors, at least one of the first and second transistors comprises a second active layer containing a different type of oxide semiconductor than the oxide semiconductor of the first active layer.

9. The scan driver of claim 5, wherein a gate electrode of the second transistor is connected to the pull-down node, a first electrode of the second transistor is connected to the first power supply terminal, and the second electrode of the second transistor is connected to the first electrode of the third transistor,
wherein a gate electrode of the third transistor is connected to the first or second scan clock terminal, the first electrode of the third transistor is connected to the second electrode of the second transistor, and a second electrode of the third transistor is connected to the pull-up node,
wherein a gate electrode of the fourth transistor is connected to the pull-up node, a first electrode of the fourth transistor is connected to the first or second scan clock terminal, and a second electrode is connected to the pull-down node,
wherein a gate electrode of the fifth transistor is connected to the first or second scan clock terminal, a first electrode of the fifth transistor is connected to the second power supply terminal, and a second electrode of the fifth transistor is connected to the pull-down node, and
wherein a gate electrode of the sixth transistor is connected to the second power supply terminal, a first electrode of the sixth transistor is connected to the pull-up node, and a second electrode of the sixth transistor is connected to a gate electrode of a pull-up transistor of the output controller.

10. The scan driver of claim 5, wherein the first and second scan clock signals repeatedly swing between a first voltage that is greater than a voltage level of the start signal or the previous scan signal generated at the gate-on voltage level or a voltage level of the scan signal output on the scan signal line, and a second voltage that is less than a voltage level of the start signal or the previous-stage scan signal generated at the gate-off voltage level.

11. A display device comprising:
a plurality of pixels arranged in a display area of a display panel;
a touch sensing unit disposed on a front side of the display panel;
a touch driver configured to detect a touch of a human body or a touch pen using a plurality of touch electrodes arranged in the touch sensing unit;
a display driver configured to control data voltages provided to the plurality of pixels and image display timing of the pixels; and
a scan driver configured to sequentially drive scan signal lines connected to the pixels in response to a gate control signal from the display driver,
wherein the scan driver comprises:
stages configured to sequentially output scan signals to scan signal lines during an active period of an nth frame, respectively, where n is a positive integer,
wherein at least one stage among the stages comprises:
an output node controller configured to apply a gate-on voltage to a pull-up node in response to a gate control signal from the display driver; and
an output controller configured to output a scan clock signal input from a scan clock terminal as a scan signal to each of the scan signal lines connected thereto when the gate-on voltage is applied to the pull-up node, and
wherein the output node controller comprises a first transistor that enables the pull-up node with a start signal or a previous-stage scan signal input having a gate-on voltage level in response to a first or second scan clock signal.

12. The display device of claim 11, wherein the output node controller enables a pull-down node or the pull-up node in response to the start signal and the first scan clock signal having the gate-on voltage level input in a first period of the active period,
wherein the output controller outputs a gate-off voltage to the scan signal line when the pull-down node is enabled, and maintains the pull-up node enabled in response to the gate-on voltage of the second scan clock signal input in a second period of the active period, and
wherein the output controller transmits the second scan clock signal having the gate-on voltage level to the scan signal line as the scan signal.

13. The display device of claim 12, wherein the output controller provides the gate-off voltage according to the second scan clock signal to the scan signal line in the first period when the pull-up node is enabled, and provides the gate-on voltage according to the second scan clock signal to the scan signal line as the scan signal in the second period when the pull-down node is floating.

14. The display device of claim 12, wherein the output node controller comprises:
a second transistor that is turned on when the pull-down node is enabled by the gate-on voltage to electrically connect a first power supply terminal with a first electrode of a third transistor;
the third transistor that is turned on by the first or second scan clock signal input to the first or second scan clock terminal to electrically connect a second electrode of the second transistor with the pull-up node;

a fourth transistor that is turned on when the pull-up node is enabled by the gate-on voltage to electrically connect the first or second scan clock terminal with the pull-down node so that the pull-down node is disabled or floating;

a fifth transistor that is turned on in response to the first or second scan clock signal to electrically connect a second power supply terminal with the pull-down node so that the pull-down node is changed to be enabled; and a sixth transistor that controls a scan output period of the pull-up node and the output controller while being turned on by the gate-on voltage input at the second power supply terminal.

15. The display device of claim 14, wherein the output controller comprises:

a seventh transistor that is turned on while the pull-down node is enabled to electrically connect the first power supply terminal with a scan output terminal to control the gate-off voltage of the first power supply terminal to be provided to the scan output terminal; and an eighth transistor that is turned on while the pull-up node is enabled to transmit the gate-on voltage of the first or second scan clock terminal to the scan output terminal, wherein the eighth transistor comprises a first active layer containing an oxide semiconductor, and wherein the seventh transistor comprises a second active layer containing a different type of oxide semiconductor than the oxide semiconductor of the first active layer.

16. The display device of claim 14, wherein, among the first to sixth transistors, at least one of the third, fourth and fifth transistors comprises a first active layer containing an oxide semiconductor, and wherein, among the first to eighth transistors, at least one of the first and second transistors comprises a second active layer containing a different type of oxide semiconductor than the oxide semiconductor of the first active layer.

17. The display device of claim 14, wherein a gate electrode of the first transistor is connected to the first or second scan clock terminal, a first electrode thereof is connected to a previous-stage carry terminal, and a second electrode thereof is connected to the pull-up node, wherein a gate electrode of the second transistor is connected to the pull-down node, a first electrode thereof is connected to the first power supply terminal, and a second electrode thereof is connected to a first electrode of the third transistor, wherein a gate electrode of the third transistor is connected to the first or second scan clock terminal, a first electrode thereof is connected to the second electrode of the second transistor, and a second electrode thereof is connected to the pull-up terminal, wherein a gate electrode of the fourth transistor is connected to the pull-up node, a first electrode thereof is connected to the first or second scan clock terminal, and a second electrode thereof is connected to the pull-down node, wherein a gate electrode of the fifth transistor is connected to the first or second first scan clock terminal, a first electrode thereof is connected to the second power supply terminal, and a second electrode thereof is connected to the pull-down node, and wherein a gate electrode of the sixth transistor is connected to the second power supply terminal, a first electrode thereof is connected to the pull-up node, and a second electrode thereof is connected to a gate electrode of a pull-up transistor of the output controller.

18. A scan driver comprising:

stages configured to sequentially output scan signals to scan signal lines, respectively, wherein one stage among the stages includes:

an output node controller configured to activate a pull-up node and a pull-down node in response to a gate control signal received from a display driver, the output node including a switching transistor directly connected to a first power supply terminal, and an output controller configured to output a scan signal to each of the scan signal lines connected thereto, the output controller including a pull-down transistor directly connected to the first power supply terminal and a pull-up transistor connected to the pull-down transistor, and wherein an active layer of the pull-up transistor includes material different from that of an active layer of the pull-down transistor.

19. The scan driver of claim 18, wherein an active layer of the switching transistor and the active layer of the pull-down transistor has the same material.

20. The scan driver of claim 19, wherein the active layer of the pull-up transistor includes indium-gallium-zinc-oxide and the active layer of the pull-down transistor includes indium-gallium-zinc-tin-oxide.

* * * * *